(12) United States Patent
Reed et al.

(10) Patent No.: US 7,116,458 B2
(45) Date of Patent: Oct. 3, 2006

(54) COHERENT GENERATION, CONVERSION, AND MODULATION OF ELECTROMAGNETIC RADIATION USING SHOCK WAVES OR SOLITONS PROPAGATING THROUGH POLARITONIC OR EXCITONIC MATERIALS

(75) Inventors: Evan Reed, Pine Island, MN (US); Marin Soljacic, Somerville, MA (US); John D. Joannopoulos, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 11/076,374
(22) Filed: Mar. 8, 2005

(65) Prior Publication Data

US 2005/0231796 A1   Oct. 20, 2005

Related U.S. Application Data

(60) Provisional application No. 60/551,127, filed on Mar. 8, 2004.

(51) Int. Cl.
*G02B 26/00* (2006.01)

(52) U.S. Cl. ................ 359/237; 359/238; 359/239
(58) Field of Classification Search ............ 359/237, 359/238, 239, 241, 244, 326, 327, 328, 329, 359/330, 331, 332, 333
See application file for complete search history.

(56) References Cited

U.S. PATENT DOCUMENTS 6,809,856 B1 * 10/2004 Reed et al. ............ 359/326

OTHER PUBLICATIONS

"Influence of Local Dispersion on Transient Processes Accompanying the Generation of rf Radiation by an Electromagnetic Shock Wave," Belyantsev et al., *Tech. Phys.* 43(1) Jan. 1998.

(Continued)

*Primary Examiner*—Timothy Thompson
(74) *Attorney, Agent, or Firm*—Gauthier & Connors LLP

(57) ABSTRACT

An optical modulator includes a crystal structure that exhibits polaritonic or excitonic behavior. A shock wave propagates through the crystal structure so as to optically modulate and manipulate a light signal propagating in the crystal structure.

27 Claims, 6 Drawing Sheets

OTHER PUBLICATIONS

Sohn, J.Y. et al., "Nano seismology: acoustic shock wave geberatin and terahertz emission from InGaN/GaN structures." Proceedings at 28th International Symposium on Compound Semiconductors, Tokyo, Japan, Oct. 1-4, 2001. IOP Publishing Ltd. Bristol, UK, 2002, pp. 387-389.

Sohn, J.Y. et al., "Terahertz emission from InGaN LED structures: excitation energy and bias dependence study." Technical Digest. Summaries of Papers Presented at the Quantum Electronics and Laser Science Conference. Conference Edition. Opt Soc. Washington, D.C., USA, vol. 1, 2002 pp. 186-187 vol. XP010612924.

Hao, H.-Y.et al., "Experiments with acoustic solutions in crystalline solids." Physical Review B, vol. 64 No. 6, Aug. 1, 2001, pp. 064302/1-7.

Eunsoon, Oh et al., "THz radiation and acoustic phonon pulse wave from GaN-based light-emitting diode structures generated by ultra short pulse lasers." Proceedings of the SPIE-The International Society For Optical Engineering SPIE-Int. Soc. Opt. vol. 5352, No. 1, 2004 pp. 180-187.

Stanton, C.J. et al., "Coherent phonons, nanoseismology and THz radiation in InGaN/GaN heterostructures." Superlattices and Microstructures Academic Press UK, vol. 34, No. 3-6, May 6, 2004, pp. 525-529.

* cited by examiner

COHERENT GENERATION, CONVERSION, AND MODULATION OF ELECTROMAGNETIC RADIATION USING SHOCK WAVES OR SOLITONS PROPAGATING THROUGH POLARITONIC OR EXCITONIC MATERIALS

PRIORITY INFORMATION

This application claims priority from provisional application Ser. No. 60/551,127 filed Mar. 8, 2004, incorporated herein in its entirety.

This invention was made with government support under Grant No. DMR-02 13282 awarded by the NSF. The government has certain rights in the invention.

BACKGROUND OF THE INVENTION

The invention relates to the field of optical modulators, and in particular to a method of modulating light utilizing shock waves in a crystal structure.

There are very few ways to generate and manipulate coherent radiation. The generation of coherent radiation is imperative for interferometry and other important optical techniques. Existing practical sources of coherent radiation are quantum lasers and free electron lasers. The technology presented in accordance with the invention represents a new source of coherent radiation.

Uses for terahertz radiation range from the new field of THz spectroscopy, to fundamental studies of phonon dynamics, to an alternative to harmful x-rays in medical imaging to security screening devices able to penetrate clothing to detect explosives or other weapons. However, the generation of narrow bandwidth radiation in the terahertz regime has proven to be a difficult task. While substantial progress has been made, existing sources of THz radiation have substantial shortcomings that limit their practical use.

Generally, existing techniques are limited to 1–10 microwatt power outputs, requiring long exposure times for probing. Quantum cascade lasers can be used to generate narrow bandwidth coherent THz radiation, but must be cooled below room temperature and are limited to frequencies above about 2 THz. Photoconductive approaches can generate only broad bandwidth THz radiation up to around 2 THz and require cooling the photoconductive element below room temperature.

Nonlinear frequency downconversion approaches can provide coherent radiation but are also limited in their efficiency, providing power outputs in 1–10 microwatt range.

SUMMARY OF THE INVENTION

According to one aspect of the invention, there is provided an optical modulator that includes a crystal structure that exhibits polaritonic or excitonic behavior. A shock wave propagates through the crystal structure so as to optically modulate and manipulate a light signal propagating in the crystal structure.

According to another aspect of the invention, there is provided an optical isolator that includes a crystal structure that exhibits polaritonic or excitonic behavior. A shock wave propagates through the crystal structure so as to optically modulate and manipulate a light signal propagating in the crystal structure.

According to another aspect of the invention, there is provided a method of modulating a light signal. The method includes providing a crystal structure that exhibits polaritonic or excitonic behavior. Also, the method includes propagating a shock wave through the crystal structure so as to optically modulate and manipulate a light signal propagating in the crystal structure.

DETAILED DESCRIPTION OF THE INVENTION

Figure 1:
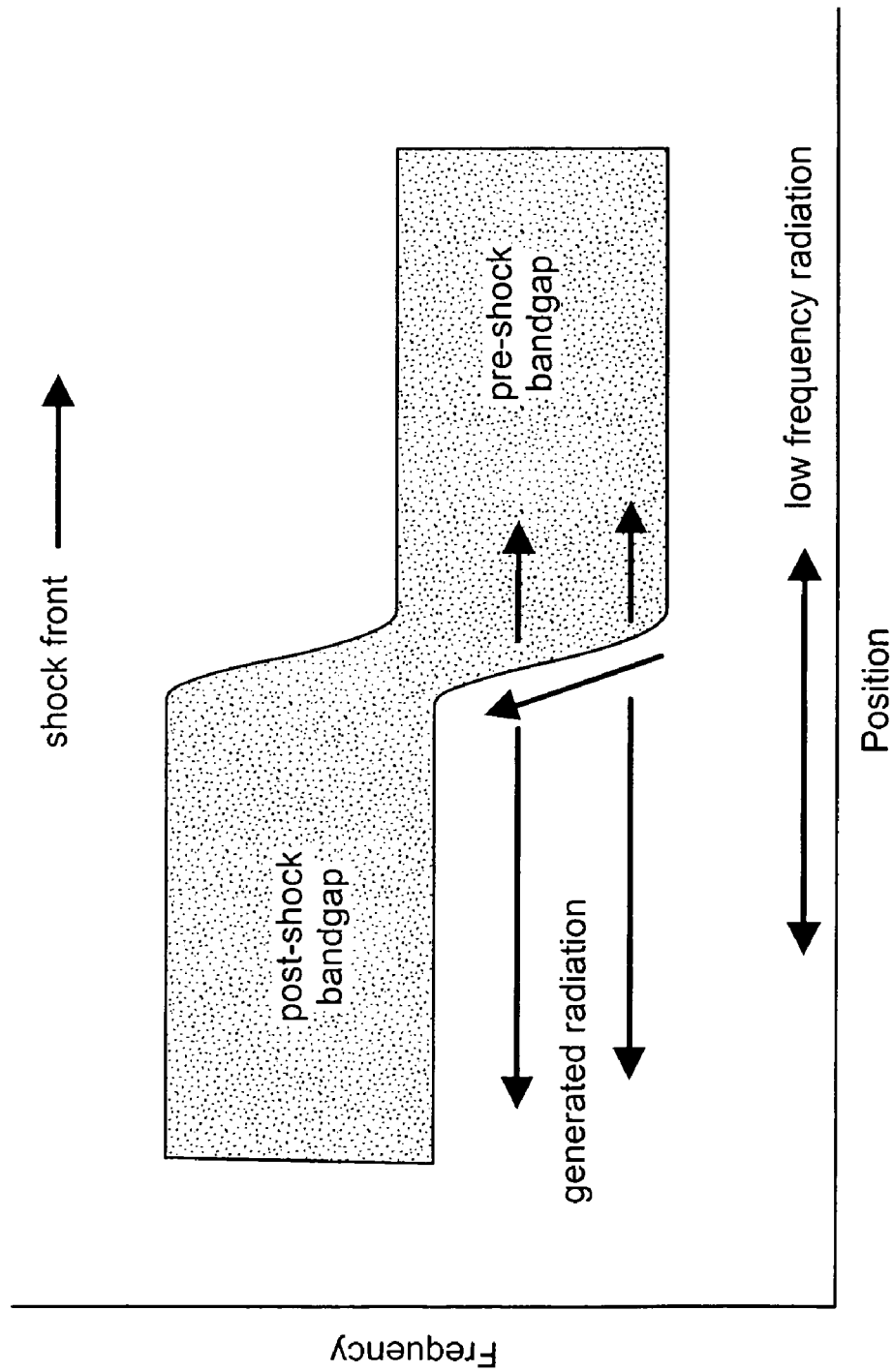
FIG. 1 is a schematic diagram of a shock wave moving to the right which increases the resonant frequency of the polarizable elements as it propagates.

The invention relates to how light can be modulated and manipulated when coupled to polaritonic and excitonic phenomena in materials containing a shock wave or shock-like propagating excitation. Theoretically predicted effects include the conversion of an applied static electric or magnetic field to coherent terahertz or optical frequency radiation and anomalous Doppler-like frequency shifts that are orders of magnitude larger than the usual Doppler shift and can be used for coherent frequency conversion.

The coherence arises in a classical fashion, in distinction to the quantum origin of coherence present in lasers. This technology represents a fundamentally new form of coherent light source. The frequency shifts are of a linear nature, distinguishing them from the usual nonlinear approaches to frequency conversion. The linearity results in intensity independent conversion efficiencies. This disclosure also details how light of optical or terahertz frequencies can be used to resolve and probe dynamical atomic scale phenomena. A nanoscale optical isolator can be constructed using this technology.

Utilizing the invention, one can show that coherent terahertz and optical radiation can be generated when a shock wave or shock-like excitation propagates through a crystal of classical polarizable electric dipoles. Many materials exhibiting polaritonic or excitonic behavior are examples of such a system. Coherent terahertz or optical frequency radiation can be generated under certain circumstances. An existing terahertz or optical frequency signal can be coherently converted to another frequency through an anomalously large Doppler-like effect. This frequency conversion effect is orders of magnitude larger than the usual Doppler shift from the moving shock wave or shock-like wave. Such a shock-like time-dependent effect can be utilized as an opto-isolator with physical size orders of magnitude smaller than the wavelength of the light on which it operates.

Miniaturization of optical-isolation systems is one of the biggest challenges to optical integration.

These new predicted effects are observable using a variety of experimental techniques. Planar shock waves can be generated using high intensity pulsed lasers. Shock fronts generated using this technique have been measured to have thicknesses of less than a few tens of crystal lattice planes. An application of the new physics in this work is the measurement of the shock front thickness with precision greater than achievable with current x-ray techniques. Such measurement constitutes ultra sub-wavelength resolution of dynamical phenomena, resolving atomic scale phenomena with light of wavelength orders of magnitude longer. Surface plasmons are another excitation that can be coupled to light to observe these predicted effects. A variety of experimental techniques can be utilized to observe these effects in surface plasmon systems.

Coherent x-rays are extremely difficult to generate using existing techniques. Approaches that do not involve the detonation of nuclear weapons (x-ray laser) are extremely inefficient (high-harmonic generation). The technology presented in this disclosure may be used to produce coherent x-rays.

To explore the phenomena associated with light scattering from a shocked polaritonic or excitonic material, perform finite-difference time-domain simulations of Maxwell's equations in one dimension, single polarization, and normal incidence. A polarizable element $$\frac{d^2 P_n(t)}{dt^2} = \mu_n(t)E_n(t) - \Omega_n(t)^2 P_n(t) - \gamma \frac{dP_n(t)}{dt}. \quad \text{Eq. 1}$$

Here, $\mu_n(t)=v_n(t)2$ where is the polarizability, v is the volume associated with each polarizable element, n(t) is the resonant frequency of the nth polarizable element, and is a damping term. Equation 1 is solved together with Maxwell's equations in 1D, $$-\frac{\partial H}{\partial x} = 4\pi J + \frac{\partial E}{\partial ct} + 4\pi \frac{\partial P}{\partial ct} \quad \text{Eq. 2}$$

$$\frac{\partial E}{\partial x} = -\frac{\partial B}{\partial ct}. \quad \text{Eq. 3}$$

$$\Omega = \Omega_0, \text{ when } x - v_s t > \beta a \quad \text{Eq. 4}$$

$$\Omega = \Omega_0 + \Delta\Omega \frac{(x - v_s t - \beta a)}{2\beta a}, \text{ when } x - v_s t < \beta a \text{ and } x - v_s t > -\beta a \quad \text{Eq. 5}$$

$$\Omega = \Omega_0 + \Delta\Omega, \text{ when } x - v_s t < -\beta a \quad \text{Eq. 6}$$

where $\Omega$ corresponds to the pre-shock state, is the shift in across the shock front 2 $\beta$ and $v_s$ is the shock speed.

The observation of some effects can be demonstrated in computer simulations of the model given above. Generation of coherent radiation can be generated from a zero frequency input signal (constant electric or magnetic field) in an insulator or by flowing a current through a metal. Consider a shock wave that propagates through an insulator. As the shock compresses the material, the resonant frequency of polarizable elements within the material can either increase or decrease depending on the material and the particular polarizable elements. In this scenario, one can consider a system where the resonance frequency of the polarizable elements increases upon shock compression. The resonant frequency of the polarizable elements in this scenario is depicted in FIG. 1.

FIG. 1 shows a schematic diagram of a shock wave moving to the right which increases the resonant frequency of the polarizable elements as it propagates. The resonant frequency of the polarizable dipoles is on the low frequency side of the polaritonic bandgap. Suppose a constant electric or magnetic field is applied throughout the material while the shock wave is propagating. This uniform field induces some moment in the polarizable elements that is emitted as multiple coherent higher frequencies when the resonant frequency of the polarizable elements is increased by the shock.

Figure 2:
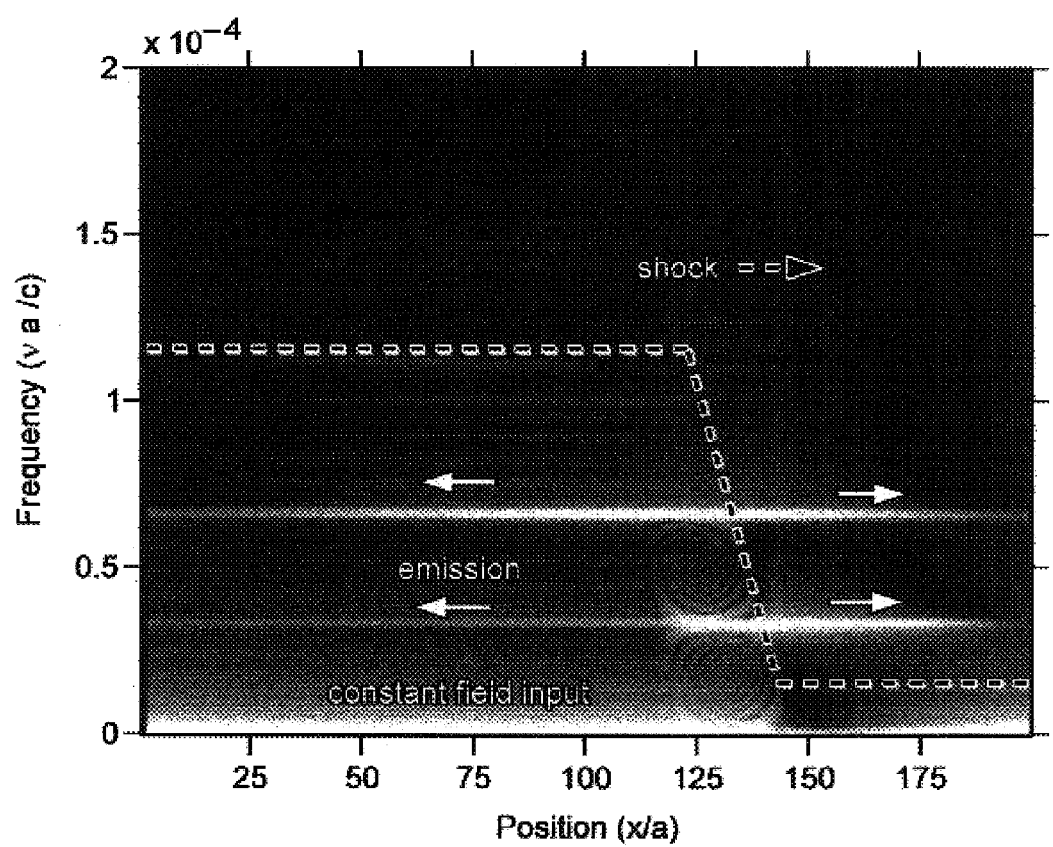
FIG. 2 is s graph illustrating the results of an FDTD simulation for the scenario in FIG. 1 when the shock propagates with a speed of $v_s=3.3\times10^{-5}c$

FIG. 2 shows results of an FDTD simulation for the scenario in FIG. 1 when the shock propagates with a speed of $v_s=3.3\times10^{-5}$ c/a which is a typical shock speed of about 10 km/sec. The resonant frequency of the polarizable dipoles ranges from $0.15\times10^{-4}$ c/a in front of the shock to $1.15\times10^{-4}$ c/a behind the shock and the loss parameter=$10^{-5}$ c/a. The polarizability $a/v=4.4\times10^3$ in front of the shock and $a/v=76$ behind the shock. The shock front thickness is 20a. FIG. 2 shows the absolute value of the Fourier transform of the magnetic field H over the time interval $t=7.5\times10^5$ a/c. During this time interval, the shock front is located is located in the vicinity of $x/a=125$ and travels a distance of approximately 25a.

Transmitting boundary conditions exist on the left and right sides of the computational cell at $x/a=0$ and $x/a=200$. There are several finite elements with no polarizability (vacuum) at the edges of the computational cell. A small amount of emitted light may be reflected from the dielectric mismatch at this interface and propagate back toward the shock as would occur under experimental conditions. A current source at $x=9a$ with zero frequency is slowly turned on at the start of the simulation (before the time interval for the Fourier transform of FIG. 2 begins.) This source generates a constant magnetic field throughout the computational cell.

As the polarizable elements are moved up in frequency by the shock compression, radiation is re-emitted at multiple discrete frequencies. The emitted radiation is of a coherent nature if the input signal is coherent. Since the input frequency is zero in this case, long time coherence of the input signal is trivial to realize. The number of frequencies emitted from the shock depends an a variety of factors which include the shock front thickness, the polarizability, the magnitude of the resonant frequency shift of the polarizable elements, and the amount of absorption in the polarizable elements.

FIG. 2 corresponds to an experimentally realizable situation. For example, if the lattice constant $a=10$ Å. The polarizable dipoles vary in frequency from 4.5 THz in front of the shock to 35 THz behind the shock. The generated radiation has frequencies of 10 and 20 THz. The frequency of the generated radiation can be varied by using a crystal with a different periodicity or sound speed because the frequencies generated in this case are approximately generated $\omega_{generated}=vs/a\,1$, where l is a positive integer. Shock front thicknesses of tens of lattice units or less are readily achievable experimentally.

A remarkable property of this frequency generation effect is that the efficiency is independent of the amplitude of the input signal. This is a result of the fact that this is a linear system, distinguishing it from the usual methods of optical frequency conversion involving the use of materials with a nonlinear optical response. In these systems great care must be taken to ensure input intensities are high enough and phase matching constraints are achieved to obtain sufficient conversion efficiency. The intensity of emitted radiation can potentially be quite high because of the ease with which large polarization fields are created at small frequencies. If the area of the shock wave is 100×100 µm an each polarizable element contains an energy of about 0.1 eV, the shock can generate radiation with an power up to 103 Watts. The efficiency of the effect increases with increasing polarizability, decreasing losses and decreasing initial lower bandgap edge.

This technology also represents a fundamentally new way to study crystallography. Crystallography is currently studied with x-rays. The technology presented here enables the study of crystal structure by monitoring the spatial and frequency dependence of emitted THz radiation when a shock or soliton propagates through the crystal.

One can consider a scenario where the input signal has a non-zero frequency. A material is utilized where the polarizable elements of an insulating material move down in frequency when compressed by the shock wave, as in FIG. 3. Consider radiation incident from the right (in the pre-shock region.) As the shock wave propagates, this radiation couples into the polarizable elements and moves down in frequency until it escapes to the right at a lower frequency.

Figure 3:
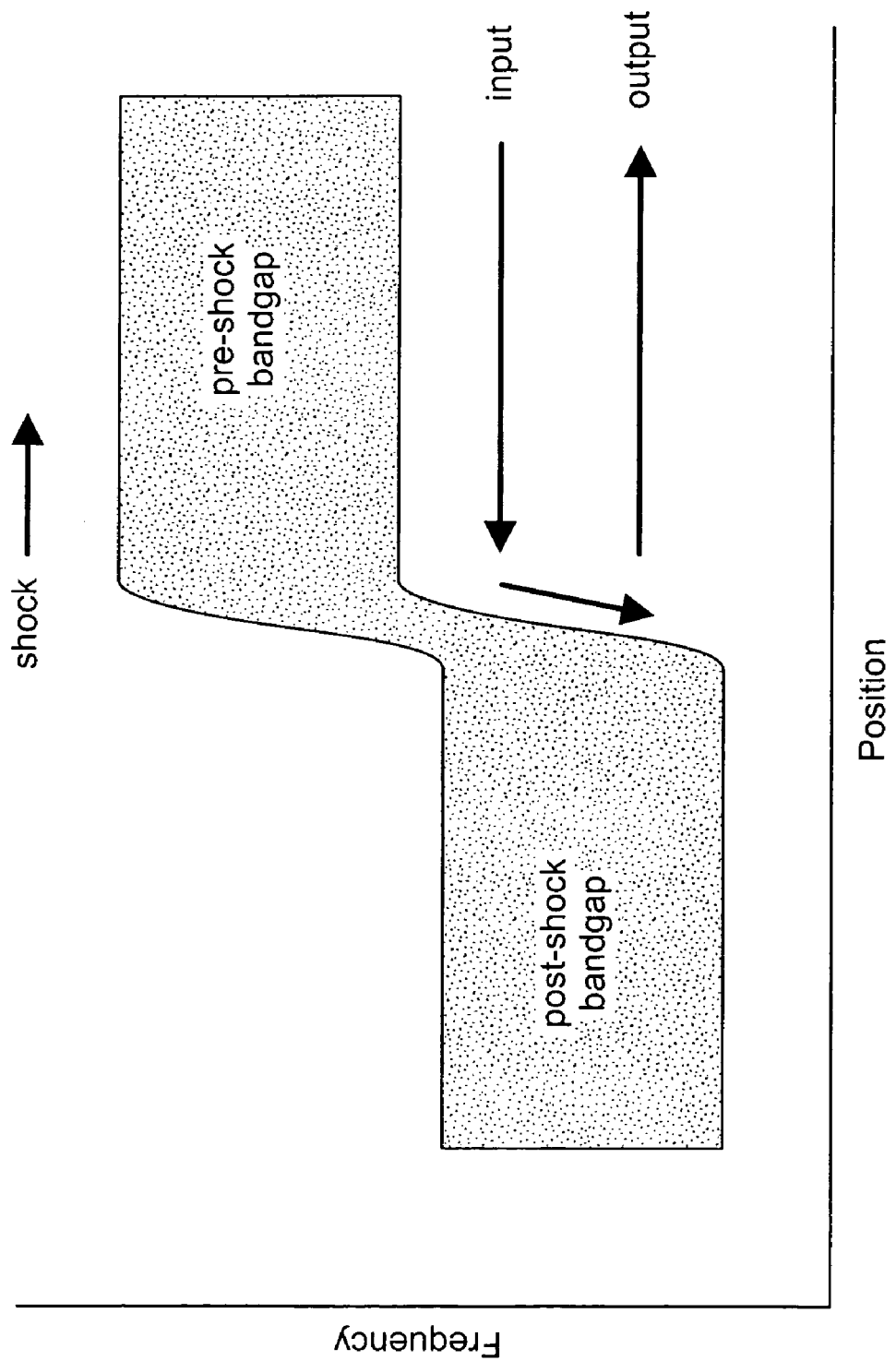
FIG. 3 is a schematic diagram of a shock wave moving to the right which decreases the resonant frequency of the polarizable elements as it propagates.
Figure 4:
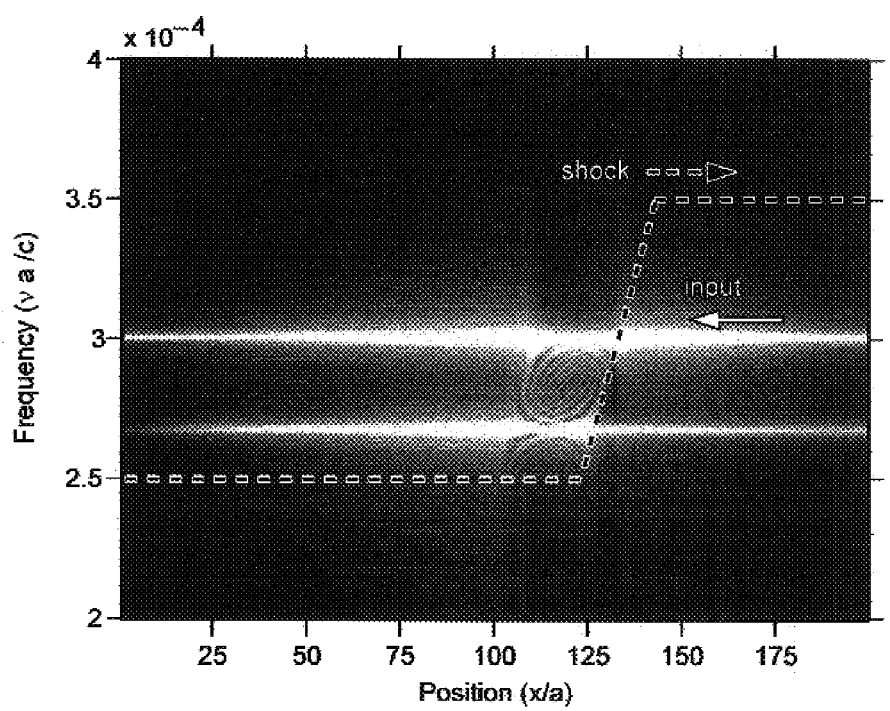
FIG. 4 is a computer simulation of the scenario illustrated in FIG. 3.

FIG. 4 shows a computer simulation of the scenario in FIG. 3. The absolute value of the Fourier transform of the magnetic field for is shown. The shock wave moves through about x/a=25 during the Fourier transform time interval. The resonant frequency of the polarizable dipoles (green dotted line) is on the low frequency side of the polaritonic bandgap. Radiation incident from the right resonantly couples into the polarizable dipoles which move down in frequency before re-emitting the radiation. The magnitude of the frequency shift in this reversed Doppler effect is several orders of magnitude larger the normal Doppler shift from an object moving at the shock speed. The re-radiated radiation is coherent if the input signal is coherent. A similar scenario can occur if the frequency of the polarizable dipoles increases upon compression.

In FIG. 4, the resonant frequency of the polarizable elements decreases from $3.5 \times 10^{-4}$ c/a in front of the shock to $2.5 \times 10^{-4}$ c/a behind the shock and the loss parameter $y=10^{-5}$ c/a. The polarizability is a/v =8 in the pre-shock region and v=16 in the post-shock region. The shock propagates with a speed of $v_s=3.3 \times 10^{-5}$ c/a which is a typical shock speed of about 10 km/sec. The shock front thickness is 20a.

Figure 5:
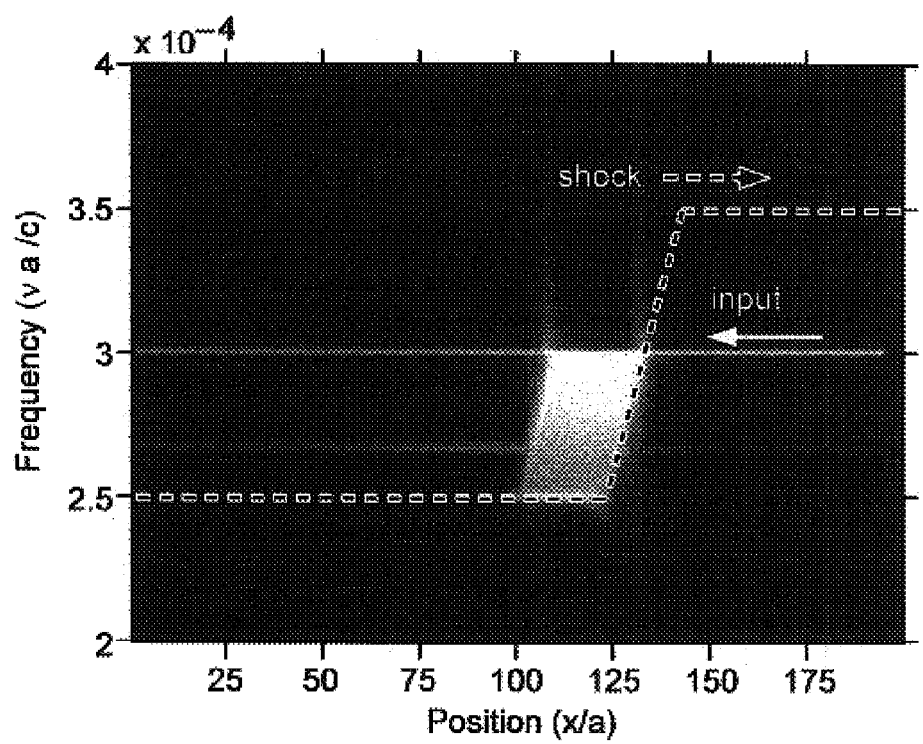
FIG. 5 is a graph illustrating the absolute value of the Fourier transform of the polarization field P for the simulation of FIG. 4.
Figure 6:
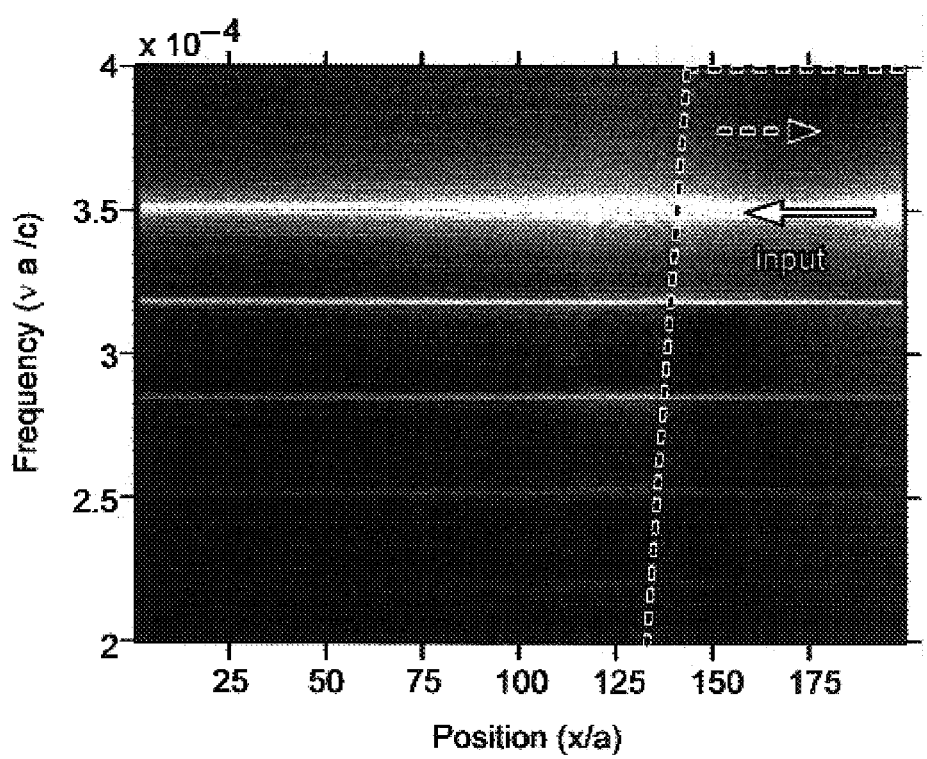
FIG. 6 is a graph illustrating the absolute value of the Fourier transform of the magnetic field H over the time interval $t=7.5\times10^5$ a/c.

Moreover, FIG. 4 shows the absolute value of the Fourier transform of the magnetic field H over the time interval $t=7.5 \times 105$ a/c. During this time interval, the shock front is located is located in the vicinity of x/a=125 and travels a distance of approximately 25a. Transmitting boundary conditions exist on the left and right sides of the computational cell at x/a=0 and x/a=200. A small amount of emitted light can be reflected from the dielectric mismatch at this interface and propagate back toward the shock as would occur under experimental conditions. A current source at x=191a with frequency $v=3\times10^{-4}$ c/a is slowly turned on at the start of the simulation (before the time interval for the Fourier transform of FIG. 4 begins.) FIG. 5 shows the absolute value of the Fourier transform of the polarization field P for the simulation of FIG. 4. The shock wave moves through about x a=25 during the Fourier transform time interval. The resonant frequency of the polarizable dipoles is on the low frequency side of the polaritonic bandgap. Radiation incident from the right resonantly couples into the polarizable dipoles which move down in frequency before re-emitting some of the radiation. Losses decrease the magnitude of the polarization as the polarizable dipoles move down in frequency. FIG. 6 shows a simulation where multiple frequencies are reflected by the shock. This simulation is similar to that shown in FIGS. 4 and 5.

FIG. 6 shows the absolute value of the Fourier transform of the magnetic field H over the time interval $t=7.5 \times 10^5$ a/c. During this time interval, the shock front is located is located in the vicinity of x/a=125 and travels a distance of approximately 25a. Transmitting boundary conditions exist on the left and right sides of the computational cell at x/a=0 and x/a=200. A small amount of emitted light may be reflected from the dielectric mismatch at this interface and propagate back toward the shock as would occur under experimental conditions. A current source at x=191a with frequency $v=3.5\times10^{-4}$ c/a is slowly turned on at the start of the simulation (before the time interval for the Fourier transform of FIG. 6 begins.)

In FIG. 6, the resonant frequency of the polarizable elements decreases from $4\times10^{-4}$ c/a in front of the shock to 0 (metallization) behind the shock and the loss parameter $\gamma=2\times10^{-5}$ c/a. The polarizability is $\alpha/v=6.2$ in the pre-shock region. The shock propagates with a speed of $v_s=3.3\times10^{-5}$ c which is a typical shock speed of about 10 km/sec. The shock front thickness is 20a.

The simulations in the figures in this section are experimentally realizable. For example, in FIG. 6 if the lattice constant a=10 Å, the dipoles vary have frequency of 120 THz in the unshocked material. The generated radiation has frequencies separated by 10 THz. The loss parameter in this simulation has the property that $$\frac{2\pi\gamma}{\Omega_{pre-shock}} = 0.05$$

0.05 which is typical of an excitonic or polaritonic excitation.

The lack of a sufficiently miniaturized technique for optical isolation presents one of the biggest challenges to optical integration. One can show how a propagating soliton-like pulse in the polarization resonance frequency can be utilized as an optical isolator. Light that is incident from the right is allowed to propagate through the device with some degree of attenuation, while light incident from the left is completely absorbed by the device. The physical size of the solitonic pulse required for such a device is orders of magnitude smaller than the wavelength of the light and is ideal for optical integration.

Figure 7A:
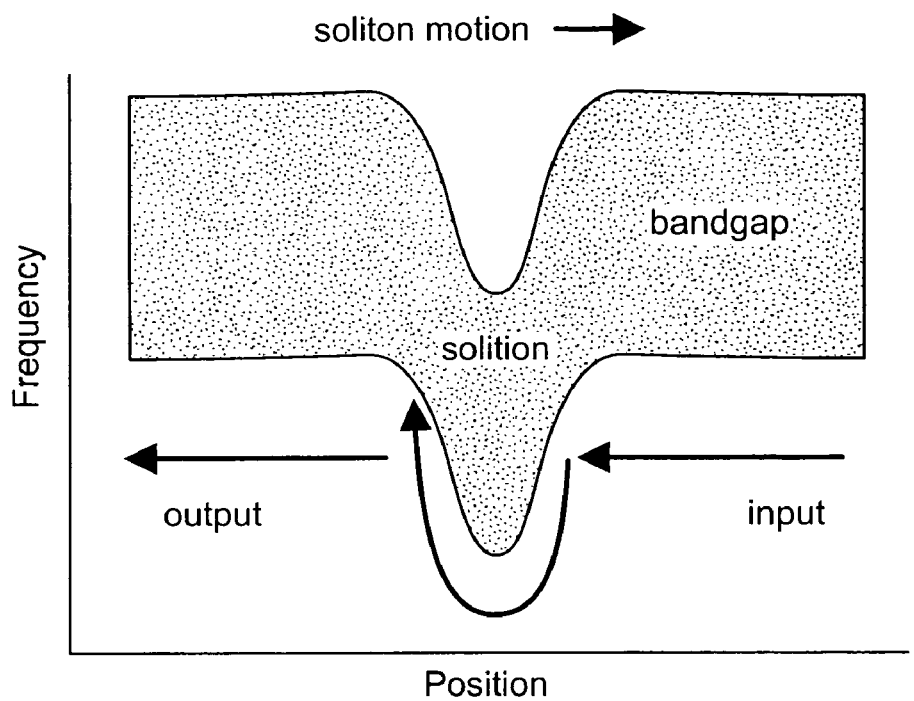
FIGS. 7A–7B are schematic diagrams illustrating the frequency of the polaritonic or excitonic bandgap as a function of position.
Figure 7B:
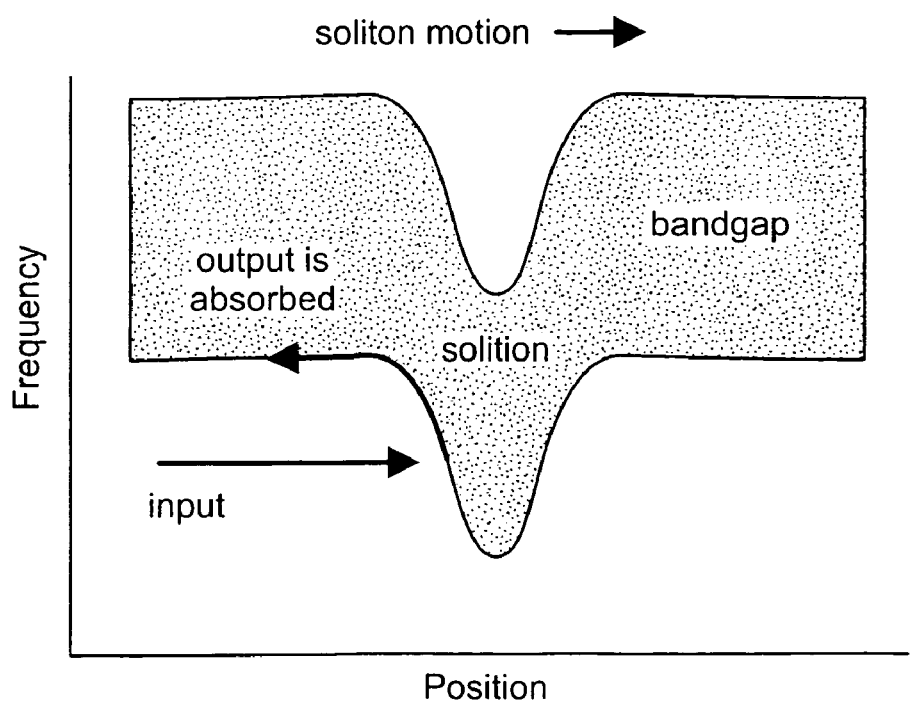

FIGS. 7A–7B show schematic diagrams of the frequency of the polaritonic or excitonic bandgap as a function of position. As the soliton propagates, it changes the resonant frequency of the polarizable elements. The pulse propagates to the right. FIG. 7A shows how light of some input frequency incident from the right can be transmitted through the soliton by coupling into and back out of the resonant elements. FIG. 7B shows how light of the same frequency incident from the left will be couple into the polarizable elements and never couple back out. The light in this case is absorbed by losses in the polarizable elements. This system represents a nanoscale optical isolator because the soliton can be of atomic spatial dimensions and light is only allowed to propagate from left to right through the system.

The lowest frequency of the soliton must be within a few $v_s$/a of the incident frequency to prevent re-emission of the absorbed radiation to the left. The incident frequency must be within $v_s/a$ of the bottom of the bandgap to ensure that the radiation from the left is absorbed instead of being re-emitted to the left. Some losses occur in the transmission scenario in the top figure. If the optical system is not sensitive to frequencies sufficiently different from the input frequency, these frequency criteria are not required. These losses are expected to depend on the spatial dimensions of the soliton, amount of intrinsic loss in the polarizable elements, and shock speed.

In a practical device, a means of repetitive generation of such solitonic pulses is also required, which would likely be the largest component of the system and the key factor in the suitability for optical integration. Solitonic pulses of the type discussed here can be generated using ultrashort pulsed lasers.

The new physical phenomena presented herein can all be understood within the context of several analytical theories and qualitative arguments.

The effects predicted are observable in materials that are not perfect crystals. In polycrystalline materials, additional frequency components are expected to be within the emission spectrum. In any real crystalline material, defects exist that diminish the crystalline properties. It is believed that the presence of defects will result in emission at frequencies other than those at which the perfect crystal emits. In liquids or amorphous materials, non-coherent emission in a broad bandwidth may occur. If the frequency shift of the polarizable elements is sufficiently large, the bandwidth of emitted radiation in this case is limited by the shock front thickness and rate of damping of the polarizable elements. This property could be used as a diagnostic tool for determination of the shock front thickness in shock wave experiments.

Atomic scale resolution of the front thickness can be determined to a degree better than is possible with current x-ray technology. It can be possible to measure the temperature of a material behind the shock front by measuring the emission from thermally populated polarizable elements as a second shock wave propagates through the material behind the first shock wave. This technology also represents a new diagnostic tool for the study of material solitons.

Dispersion in phonon bands can be neglected in polaritonic systems because the shock speed is considerably faster than optical phonon speeds. This may not hold in excitonic systems, but no bands are expected to exist in sharp shock fronts where the frequencies of polarizable elements are sufficiently different to prevent exciton transport. The effects presented in this disclosure are expected to be observable when the shock wave propagates off-axis to the crystal. This scenario is not a 1D scenario. Thermal effects can also diminish coherence properties, but the polarization due to the electromagnetic radiation can be made considerably larger than polarization due to thermal effects.

An additional embodiment of this invention is to utilize surface plasmons as the polarizable elements. Surface plasmons are charge density waves that propagate at the interface between a metal and a dielectric material. The resonant frequency of surface plasmons can be varied in a shock-like fashion by modulating the dielectric of the dielectric material in a shock-like fashion, either by sending a physical shock through the dielectric or through other means of modulation. It is also likely possible to observe the effects presented here in systems that do not involve physical shock waves. For example, the generation and manipulation of coherent x-rays may be possible if the resonant frequency of the polarizable dipoles can be changed by a pulse of light propagating through a material. In this case, the generated frequencies are on the order of $10^4$ eV if v c and a 1°A. Atomic core electronic states may be utilized as the polarizable elements in this scenario. Coherent x-rays are extremely difficult to generate using existing techniques. Approaches that do not involve nuclear weapons (x-ray laser) are extremely inefficient (high-harmonic generation). The technology described here can be utilized to generate coherent phonons, which can be used for a variety of purposes including nanoscale imaging.

Although the present invention has been shown and described with respect to several preferred embodiments thereof, various changes, omissions and additions to the form and detail thereof, may be made therein, without departing from the spirit and scope of the invention.

What is claimed is:

1. An optical modulator comprising:
   a crystal structure that exhibits polaritonic or excitonic behavior; and
   a shock wave that propagates through said crystal structure so as to optically manipulate a light signal propagating in said crystal structure.

2. The optical modulator of claim 1, wherein said shock wave is generated using high intensity pulsed lasers.

3. The optical modulator of claim 1, wherein said crystal structure comprises polarizable dipoles.

4. The optical modulator of claim 1, wherein said shock wave travels with the speed of about 10 km/sec in said crystal structure.

5. The optical modulator of claim 3, wherein said polarizable dipoles vary in frequency from 4.5 THz–35 THz behind the shock wave.

6. The optical modulator of claim 1, wherein said shock wave comprises soliton-like pulses.

7. The optical modulator of claim 1, wherein said soliton-like pulses are formed by ultrashort pulsed lasers.

8. The optical modulator of claim 1, wherein said optical manipulation comprises optically modulating said light signal.

9. The optical modulator of claim 1, wherein said optical manipulation comprises producing a coherent light signal.

10. A method of optical modulation of a light signal comprising:
    providing a crystal structure that exhibits polaritonic or excitonic behavior; and
    propagating a shock wave through said crystal structure so as to optically modulate and manipulate a light signal propagating in said crystal structure.

11. The method of claim 10, wherein said shock wave is generated using high intensity pulsed lasers.

12. The method of claim 9, wherein said crystal structure comprises polarizable dipoles.

13. The method of claim 9, wherein said shock wave travels with the speed of about 10 km/sec in said crystal structure.

14. The method of claim 11, wherein said polarizable dipoles vary in frequency from 4.5 THz–35 THz behind the shock wave.

15. The method of claim 10, wherein said shock wave comprises soliton-like pulses.

16. The method of claim 10, wherein said soliton-like pulses are formed by ultrashort pulsed lasers.

17. The method of claim 10, wherein said optical manipulation comprises optically modulating said light signal.

18. The method of claim 10, wherein said optical manipulation comprises producing a coherent light signal.

19. An optical isolator comprising:
a crystal structure that exhibits polaritonic or excitonic behavior;
a shock wave that propagates through said crystal structure so as to optically manipulate a light signal propagating in said crystal structure.

20. The optical isolator of claim 19, wherein said shock wave is generated using high intensity pulsed lasers.

21. The optical isolator of claim 19, wherein said crystal structure comprises polarizable dipoles.

22. The optical isolator of claim 19, wherein said shock wave travels with the speed of about 10 km/sec in said crystal structure.

23. The optical isolator of claim 21, wherein said polarizable dipoles vary in frequency from 4.5 THz–35 THz behind the shock wave.

24. The optical isolator of claim 19, wherein said shock wave comprises soliton-like pulses.

25. The optical isolator of claim 19, wherein said soliton-like pulses are formed by ultrashort pulsed lasers.

26. The optical isolator of claim 19, wherein said optical manipulation comprises optically modulating said light signal.

27. The optical isolator of claim 19, wherein said optical manipulation comprises producing a coherent light signal.

* * * * *